United States Patent
Neugeboren et al.

(10) Patent No.: US 11,700,072 B2
(45) Date of Patent: *Jul. 11, 2023

(54) TIMING SYNCHRONIZATION OVER CABLE NETWORKS

(71) Applicant: ARRIS Enterprises LLC, Suwanee, GA (US)

(72) Inventors: Yair Neugeboren, Netanya (IL);
Eliezer Baruch, Alpharetta, GA (US);
Ian G. Wheelock, Blackrock (IE)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/709,581

(22) Filed: Dec. 10, 2019

(65) Prior Publication Data

US 2020/0119826 A1    Apr. 16, 2020

Related U.S. Application Data

(63) Continuation of application No. 16/220,758, filed on Dec. 14, 2018, now Pat. No. 10,530,512.

(Continued)

(51) Int. Cl.
*H04J 3/06*   (2006.01)
*H04L 7/04*   (2006.01)
(Continued)

(52) U.S. Cl.
CPC .......... *H04J 3/0667* (2013.01); *H04J 3/0682* (2013.01); *H04J 3/0688* (2013.01); *H04L 7/033* (2013.01);
(Continued)

(58) Field of Classification Search
CPC ...... H04J 3/0667; H04J 3/0682; H04J 3/0688; H04L 7/033; H04L 7/048
(Continued)

(56) References Cited

U.S. PATENT DOCUMENTS 7,539,208 B2   5/2009   Chapman et al.
8,982,777 B1   3/2015   Pearson et al.
(Continued)

FOREIGN PATENT DOCUMENTS

EP    2879322 A1    6/2015

OTHER PUBLICATIONS

"DOCSIS 3.1 MAC and Upper Layer Protocols Interface Specification", Cable Television Laboratories, May 8, 2018, 889 pages.
(Continued)

*Primary Examiner* — Leila Malek
(74) *Attorney, Agent, or Firm* — Chernoff, Vilhauer, McClung & Stenzel, LLP (57) ABSTRACT

In one embodiment, a method receives a first time from a network device. The first time is derived from a first timing source in a first domain. The method receives a second time in a second domain from a second timing source. A difference time value is calculated between the first time and the second time. The method then sends the difference time value to the network device where the network device uses the difference time value to send a delay value to other computing devices to synchronize timing of the other computing devices in the second domain. The other computing devices are configured to synchronize the respective time using the delay value with mobile network devices to allow timing synchronization between the mobile network devices.

14 Claims, 6 Drawing Sheets

Related U.S. Application Data (60) Provisional application No. 62/663,742, filed on Apr. 27, 2018.

(51) Int. Cl.
*H04L 7/033* (2006.01)
*H04L 12/28* (2006.01)

(52) U.S. Cl.
CPC ............ *H04L 7/048* (2013.01); *H04J 3/0661* (2013.01); *H04L 12/2801* (2013.01)

(58) Field of Classification Search
USPC .......................................................... 375/257
See application file for complete search history.

(56) References Cited

U.S. PATENT DOCUMENTS

| | | | |
|---|---|---|---|
| 9,252,902 B2 | 2/2016 | Chapman et al. | |
| 2010/0298020 A1* | 11/2010 | Dolgov | H04W 72/12 455/514 |
| 2012/0300859 A1* | 11/2012 | Chapman | H04J 3/0664 375/257 |
| 2015/0207579 A1* | 7/2015 | Chapman | H04J 3/0682 370/503 |
| 2018/0054251 A1* | 2/2018 | Alex | G01S 19/54 |
| 2018/0116009 A1* | 4/2018 | Chen | H04L 5/0035 |

OTHER PUBLICATIONS

PCT International Search Report & Written Opinion, Re: Application No. PCT/US2019/027773, dated Jul. 19, 2019.

\* cited by examiner

TIMING SYNCHRONIZATION OVER CABLE NETWORKS

CROSS-REFERENCES TO RELATED APPLICATIONS

The present disclosure claims priority to U.S. patent application Ser. No. 16/220,758 filed on Dec. 14, 2018, now U.S. Pat. No. 10,530,512, which in turn claims priority to U.S. Provisional App. No. 62/663,742, entitled "SUPPORTING MOBILE SMALL CELL TIMING SYNCHRONIZATION OVER DOCSIS", filed Apr. 27, 2018, the contents of which is incorporated herein by reference in its entirety.

BACKGROUND

Some network operators are building out cellular networks, such as small cellular base stations, to handle the growth in mobile data consumption. The data traffic is sent to a back haul network to a core of the mobile network. Different options for the back haul network may be available, such as fiber and microwave; however, hybrid fiber co-axial (HFC) networks may also be used.

Mobile base stations need to be frequency and phase synchronized to guarantee handover performance for subscriber end devices. For example, when a mobile device switches over from one mobile base station to another mobile base station, these base stations need to be synchronized to ensure the correct handover from mobile base station to mobile base station for a subscriber end device. The back haul network typically provides the frequency and timing (e.g., phase) synchronization to the mobile base stations.

Mobile networks may use a timing protocol, such as Institute of Electrical and Electronics Engineers (IEEE)-1588, to provide synchronization over the network. IEEE-1588 in addition to other timing protocols assumes that the network delay in the upstream and the downstream paths is symmetrical. Any delay asymmetry in the network will effectively cause a phase error of 0.5 of the asymmetry value. In addition, the timing synchronization is sensitive to packet delay variations (PDV) in the network. A large PDV will cause timing synchronization errors.

An HFC network may use a protocol, such as data-over-cable service interface specification (DOCSIS), to deliver packets over the back haul network for the mobile network. As DOCSIS is a packet-based network, some network asymmetry in packet delay variation may be introduced in the DOCSIS network. For example, DOCSIS presents challenges due to asymmetry of the nature of the DOCSIS upstream scheduling, jitter (PDV) due to the upstream scheduling, low-bandwidth channels that cause larger packet transition time, and unknown delays in asymmetries in a cable modem termination system (CMTS), cable modem physical devices, and the HFC network. Attempting to send packets with timing information on top of a DOCSIS network does not provide the required timing and frequency accuracy needed for a mobile network.

DOCSIS may use a timing protocol, such as DOCSIS timing protocol (DTP), that synchronizes the frequency and time of the network. Frequency is addressed by coupling the cable modem Ethernet timing to the DOCSIS downstream baud clock. The time synchronization is addressed by coupling a cable modem timestamp message to a DOCSIS extended timestamp. The time offset in asymmetry is addressed through measurement signaling and ranging. To address the asymmetry, the DOCSIS system needs to measure multiple times within the HFC network. This results in a large number of measurements to be made. The large number of measurements then complicates calculation to perform the synchronization.

DETAILED DESCRIPTION

Described herein are techniques for a timing synchronization system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

Some embodiments do not attempt to measure the delay from a network device, such as a cable modem termination system (CMTS) to a downstream client (e.g., cable modem) by using a round-trip delay, and calibrating the asymmetries as discussed above in the Background. Rather, a reference cable modem may use an external timing source to calculate the delay from the CMTS to the reference cable modem. The reference cable modem does not need to deal with the various asymmetries in a network, such as delays in the network path. This also eliminates reliance on the upstream path, which may contain jitter and packet delay variation as discussed in the Background.

A reference cable modem may receive a CMTS time from the CMTS through the network, such as a DOCSIS network. The CMTS time may be a time in which the CMTS sent a packet including a timestamp of the current time to the reference cable modem (CM). The CMTS time is locked to an external reference time that is traced to the same reference as the external timing source of the reference CM. The reference cable modem may also receive an external time from an external timing source. The external time may be a current time as determined by the external timing source. The reference cable modem uses the CMTS time and the external time from the timing source to calculate a difference time value from the CMTS to the reference cable modem. This difference time value can be used to determine is the actual delay between the time the CMTS sent the CMTS time in a packet and a time the packet was processed by the cable modem.

The reference cable modem can send the calculated difference time value back to the CMTS, which can then use the calculated difference time value to send a delay to other cable modems. These cable modems can use the delay to synchronize the CMTS time with mobile network devices.

System Overview

Figure 1:
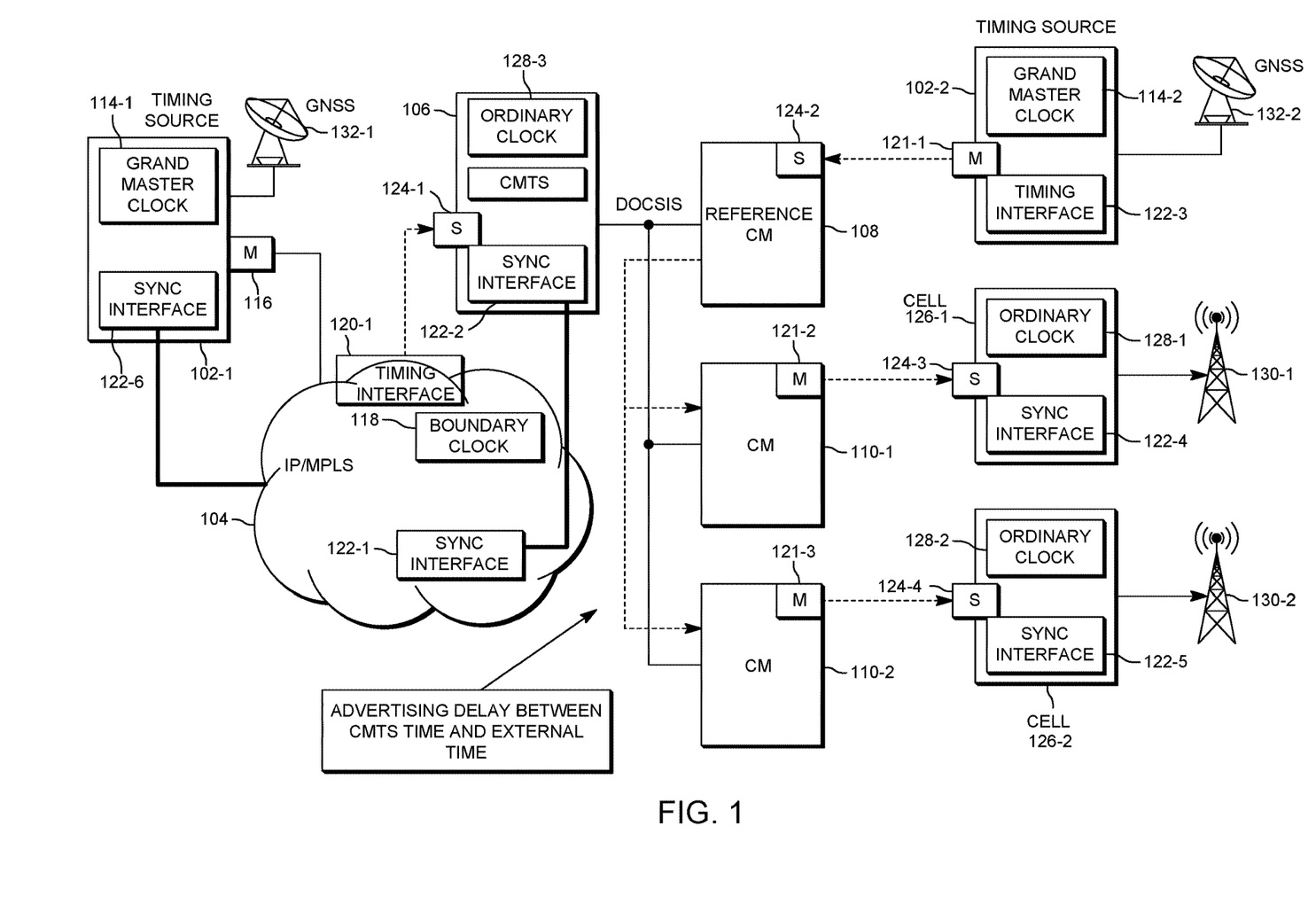
FIG. 1 depicts a simplified system for synchronizing timing in a network according to some embodiments.

FIG. 1 depicts a simplified system for synchronizing timing in a network according to some embodiments. The system includes a timing source 102-1, a network 104, a network device 106, a reference downstream client 108, other downstream clients 110-1 to 110-2, and a second timing source 102-2.

A network device may be located at the head end of a network and may include CMTS 106. CMTS 106 may be implemented in a network device in the head end and may provide the frequency and time to the downstream clients. Although CMTS 106 is used, other network devices may be appreciated that can provide the frequency and time synchronization signals to downstream clients, such as a remote physical device (R-PHY) or remote media access control physical device (R-MACPHY). Also, network device 106 may not be located at the head end, but may be remotely located from the head end as in the R-PHY configuration. The term CMTS will be used for discussion purposes, but other network devices may be appreciated.

Reference downstream client 108 and downstream clients 110-1 to 110-2 may be subscriber devices that are located downstream from CMTS 106. For example, downstream clients 110-1 to 110-2 may be cable modems in a subscriber's premises. Reference client 108 may be connected to the same fiber node as downstream clients 110-1 to 110-2. The term cable modem will be used for discussion purposes, but other devices may be appreciated, such as gateways or other end devices.

Cable modems 110-1 to 110-2 may communicate with mobile network devices (CELL) 126-1 and 126-2, respectively. Mobile network devices 126 may be cellular base stations that may communicate a cellular signal 130-1 and 130-2, respectively, to mobile end devices (not shown). In some embodiments, mobile network devices 126 may be connected downstream from cable modems 110-1 and 110-2, such as connected to a local area network (LAN) provided by the cable modem. Cable modems 110-1 and 110-2 need to maintain frequency synchronization and time (e.g., phase) synchronization with mobile network devices 126-1 and 126-2, respectively. The following will describe how timing synchronization is maintained with mobile network devices 126.

Timing sources 102-1 and 102-2 may provide a master time for clock synchronization. A timing source 102-1 may generate a time for clock synchronization for the network. For example, timing source 102-1 receives a time signal from a global navigational satellite system (GNSS) or global positioning satellite (GPS) system 132-1. Timing source 102-1 includes a grand master (GM) clock 114-1 that is the ultimate master of time for clock synchronization within the network. Timing source 102-1 may use the protocol IEEE-1588 for synchronization as will be discussed below. Timing source 102-1 includes a master (M) port 116 that provides the GM clock timing signal to network 104.

Network 104 may include multiple network devices (not shown) that transfer the time. In some embodiments, network 104 may be a packet-based network that uses a protocol, such as an Internet Protocol or multi-protocol label switching (MPLS) protocol. Network 104 includes a boundary clock (BC) 118 that may be the ultimate source of time for a domain, such as a the domain upstream from CMTS 106 (e.g., a precision time protocol (PTP) domain). Boundary clock 118 may terminate the timing signal from grand master clock 114-1 and then provide it to CMTS 106 through a timing interface 120-1. Boundary clock 118 may be thought of as a grand master clock.

Network 104 may also include a sync interface 122-1 that may be used to provide frequency synchronization. For example, synchronous Ethernet (syncE) may be used, but other protocols may also be used to maintain frequency synchronization. Sync interface 122-1 may communicate with sync interface 122-2 in CMTS to maintain the frequency synchronization.

CMTS 106 receives the timing signal at a slave port (S) 124-1. CMTS 106 includes an ordinary clock 128-3 that may be a clock that maintains the time used within the domain downstream of the CMTS, such as the domain downstream of CMTS. Ordinary clock 128-3 may have two states, a slave clock that receives the time from timing interface 120-1. Also, ordinary clock 128-3 sources time to one or more slaves. In this case, ordinary clock 128-3 sources the time through a network to reference cable modem 108 and downstream clients 110-1 to 110-2. In some embodiments, CMTS 106 sends a CMTS time (e.g., a timestamp) through a network in a packet based on a protocol, such as DOCSIS. This protocol is different from the protocol used upstream from CMTS 106 in network 104. This causes the different timing domains upstream from CMTS 106 and downstream from CMTS 106. The CMTS time is a time in which the packet is sent from CMTS 106 to reference cable modem 108 using the timing signal from timing source 114-1.

Reference cable modem 108 receives the CMTS time in a packet from CMTS 106. As discussed above, the packet may experience some delay from being sent from CMTS 106 to reference cable modem 108. Reference cable modem 108 then needs to calculate the difference from the CMTS time and a current grand master clock time.

Reference cable modem 108 uses an external timing source 102-2 to determine the difference (e.g., delta). Timing source 102-2 may be similar to timing source 102-1 and receives a timing signal from GNSS 132-2, which may derive a time similarly to GNSS 132-1. In other embodiments, cable model 108 is connected to timing source 102-2 via a LAN interface using a timing protocol, such as PTP. Timing source 102-2 also includes grand master clock 114-2 that can generate an external time. A master port 121-1 sends the external time to a slave port 124-2 at reference cable modem 108. Now, reference cable modem 108 includes the CMTS time (e.g., DOCSIS extended time) and the current external time (e.g., the grand master time) from timing source 102-2. Reference cable modem 108 can then calculate the difference between the CMTS time and the external time. This is the delay that is taken to send the CMTS time from CMTS 106 to reference cable modem 108.

Reference cable modem 108 sends the difference back to CMTS 106. CMTS 106 can then advertise a delay between the CMTS time and the grand master time to other cable modems 110-1 and 110-2.

Cable modems 110-1 and 110-2 can then use the delay to synchronize their clocks. For example, cable modem 110-1 receives the CMTS time and the delay and uses the delay to adjust the CMTS time received from CMTS 106. The adjusted time may then be sent through a master port 121-2 to a slave port 124-3 of mobile network device 126-1. Similarly, cable modem 110-2 may receive the CMTS time and the delay. In some embodiments, cable modem 110-2 may receive a different delay depending on a difference in the delay that may be calculated to send packets between cable modems 110-1 to 110-2. This will be discussed in more detail below as different cable modems may experience different delays. Cable modem 110-2 uses a master port 121-3 to communicate an adjusted time to a slave port 124-4 of mobile network device 126-2.

The CMTS times provided to mobile network devices 126-1 and 126-2 are now synchronized in the time domain. Also, mobile network device 126-1 includes a sync interface 122-4 that can be used to sync the frequency. Similarly, mobile network device 126-2 includes a sync interface 122-5 that can sync the frequency of the mobile network device. In some embodiments, the frequency synchronization may be performed using the syncE protocol. Accordingly, the time and frequency being used by mobile network device 126-1 and mobile network device 126-2 are synchronized and problems with handover between multiple end devices may not occur.

The above process that uses an external timing source 102-2 does not require reference cable modem 108 to measure the asymmetric delay between CMTS 106 and reference cable modem 108 in the DOCSIS network. Reference cable modem 108 does not need to send ranging messages to CMTS 106 and calculate the round-trip delay for the ranging messages. Also, network devices do not need to measure the asymmetry between sending the messages upstream and downstream. This simplifies the clock calculation and synchronization process. For example, fewer calculations and measurements need to be performed when using external timing source 102-2.

Figure 2:
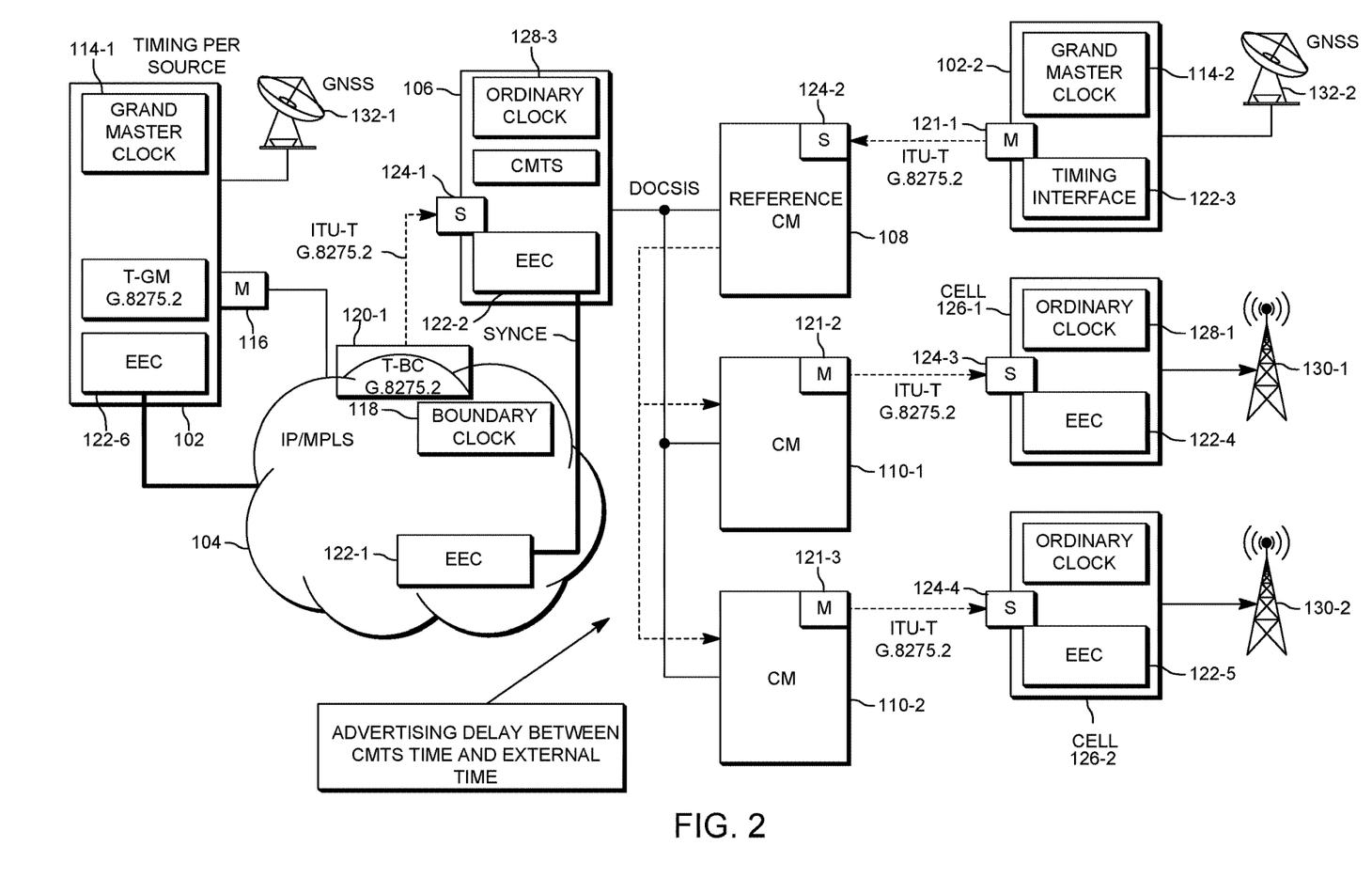
FIG. 2 depicts an example of timing and frequency protocols that can be used according to some embodiments.

The system may use different protocols to maintain the timing and frequency synchronization. The following will discuss specific protocols, but other protocols can be used. FIG. 2 depicts an example of timing and frequency protocols that can be used according to some embodiments. For example, the time may be synchronized using an IEEE-1588 protocol. In some examples, the International Telecommunication Union (ITU)-T G.8275.1 and ITU-T G.8275.2 profiles may be used. ITU-T G.8275.2 will be used for discussion purposes, but ITU-T G.8275.1 may also be used in place of or in combination of ITU-T G.8275.2. Also, successive protocols to ITU-T G.8275.1 and ITU-T G.8275.2 may be appreciated. Although these protocols are described, other protocols may be used. The IEEE-1588 protocols and ITU-T profiles are different from the protocols (e.g., DOCSIS) that are used to transport the time between CMTS 106 and reference cable modem 108 and cable modems 110 may be used.

The frequency synchronization may use synchronous Ethernet (SyncE). Grand master clock 114-1 and timing source 102-1 may receive a timing signal from GNSS 132-1. A master port 116 provides a time T-GM from grand master clock 114-1. A master port 116 is a T-GM G.8275.2 master port that provides the grand master time.

Boundary clock 118 receives the time and a T-BC G.8275.2 port 120-1 can provide the time using the protocol IEEE-1588 and ITU-T G.8275.2 profile to a slave port 124-1. An EEC device 122-1 uses the protocol SyncE to communicate frequency synchronization information to an EEC device 122-2 in CMTS 106. CMTS 106 can then provide the CMTS time via the DOCSIS network to reference cable modem 108. Reference cable modem 108 also receives an external time from timing source 102-2. For example, a grand master clock 114-2 receives the external time from GNSS 132-2. A T-GM G.8275.2 master port 121-2 provides the external time using the protocol IEEE-1588 and ITU-T G.8275.2 profile to slave port 124-2. Reference cable modem 108 calculates the difference from the CMTS time received from CMTS 106 to the external time received from grand master clock 114-2. As discussed above, reference cable modem 108 provides the difference to CMTS 106.

CMTS 106 can provide a CMTS time to cable modems 110-1 and 110-2 in addition to a delay. Cable modem 110-1 calculates an adjusted time and uses a master port 121-2 to send the adjusted time using a protocol IEEE-1588 and ITU-T G.8275.2 profile to a slave port 124-3. Additionally, cable modem 110-2 calculates an adjusted time and uses a master port 121-3 to send the adjusted time using a protocol IEEE-1588 and ITU-T G.8275.2 profile to a slave port 124-4. The times at mobile network devices 126-1 and 126-2 are now synchronized using the protocol ITU-T G.8275.2. Additionally, the frequency may be synchronized using SyncE at EEC device 122-4 in mobile network device 126-1 and EEC device 122-5 in mobile network device 126-2.

Timing Calculations

Figure 3:
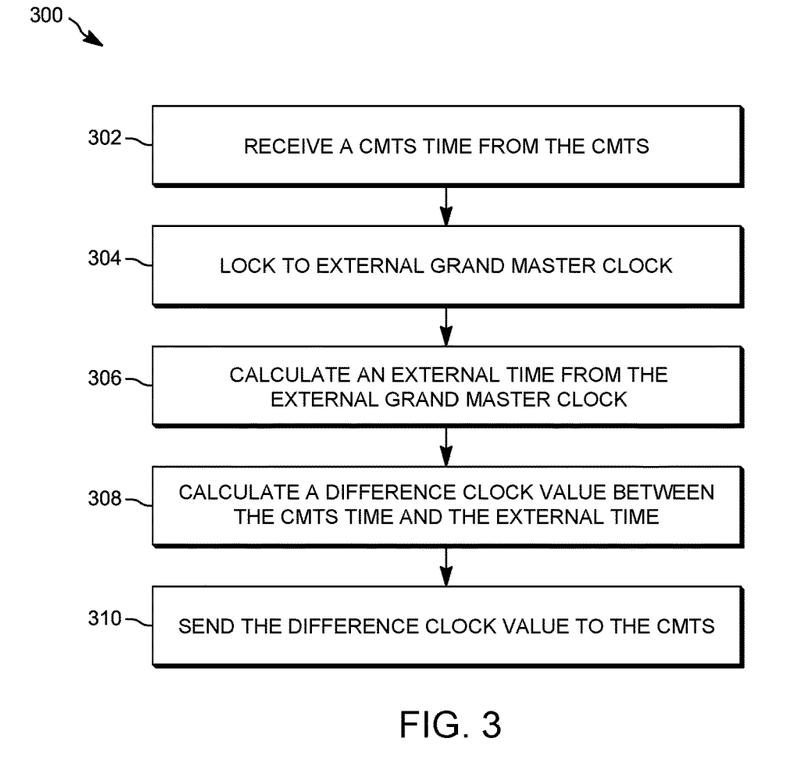
FIG. 3 depicts a simplified flowchart of a method for calculating the difference in clock values at a reference cable modem according to some embodiments.

FIG. 3 depicts a simplified flowchart 300 of a method for calculating the difference in clock values at reference cable modem 108 according to some embodiments. At 302, reference cable modem 108 receives a CMTS time ($T_{CMTS}$) from CMTS 106. CMTS 106 received a GPS time ($T_{GPS-N}$) derived from GNSS 132-1. A CM time $T_{CM-D}$ is the CMTS time that the cable modem 108 received from CMTS 106. The CM Time $T_{CM-D}$ is the same as the CMTS time $T_{CMTS}$. That is, CM Time $T_{CM-D}$ is the CMTS time $T_{CMTS}$ received in the packet.

At 304, reference cable modem 108 locks to an external grand master clock 114-2. This is the external grand master clock that may be downstream from reference cable modem 108. This grand master clock may be different from grand master clock 114-1, but both provide the same time. At 306, reference cable modem 108 calculates an external time $T_{CM-1}$ from the external grand master clock 114-2.

At 308, reference cable modem 108 calculates a difference time value between the CMTS time and the external time. The difference time value ($D_{CM-R}$) is the difference between the CMTS time and the external time ($D_{CM-R}$ = $T_{CM-D} - T_{CM-1}$). At 310, reference cable modem 108 sends the difference time value $D_{CM-R}$ back to CMTS 106. Although sending the difference time value is discussed, reference cable modem 108 may send the external time to CMTS 106, which can then calculate the difference time value.

Figure 4:
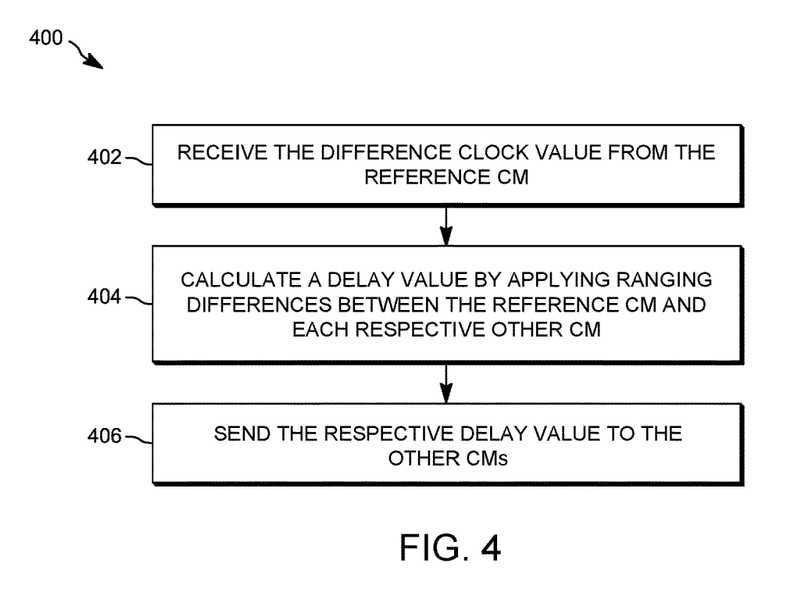
FIG. 4 depicts a simplified flowchart of a method for processing the difference time value at a cable modem termination system (CMTS) according to some embodiments.

FIG. 4 depicts a simplified flowchart 400 of a method for processing the difference time value at CMTS 106 according to some embodiments. At 402, CMTS 106 receives a difference time value $D_{CM-R}$ from reference cable modem 108. The difference time value $D_{CM-R}$ is the difference between the DOCSIS derived time, which is the CMTS time, and the external source derived time from reference cable modem 108 ($T_{CM-1}$). Alternatively, CMTS 106 may calculate the difference time value using the external time.

At 404, CMTS 106 calculates a delay value by applying ranging differences between reference cable modem 108 and each of respective cable modems 110-1 to 110-2. The ranging differences may be the differences in communicating a message from reference cable modem 108 to CMTS 106 and back versus communicating a message from cable modem 110-1 to CMTS 106 and back and also from cable modem 110-2 to CMTS 106 and back. The ranging differences between reference cable modem 108 and each cable modem 110 may take into account the different delays in sending a packet from CMTS 106 in each respective cable modem 110. That is, it may take a different amount of time to send a packet from CMTS 106 to reference cable modem 108 compared to sending a packet from CMTS 106 to cable modem 110. The delay is $D_{CM-I}$, which is the delay that should be added by cable modem to the DOCSIS derived time $T_{CM-D}$. At 406, CMTS 106 sends the respective delay value to other cable modems 110.

Figure 5:
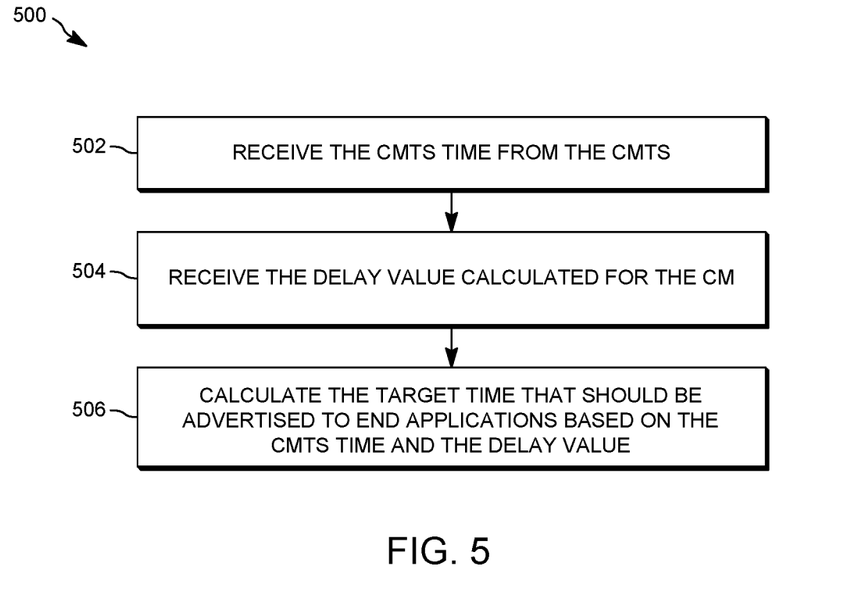
FIG. 5 depicts a simplified flowchart of a method for processing the time received from the CMTS at cable modems according to some embodiments.

FIG. 5 depicts a simplified flowchart 500 of a method for processing the time received from CMTS 106 at cable modems 110 according to some embodiments. This process may be performed at each cable modem, such as cable modems 110-1 and 110-2, but with different delays for each respective cable modem. In other embodiments, CMTS 106 may send the same delay to each cable modem because the difference in delays may be small enough that synchronization errors do not exist. At 502, cable modem 110 receives a first time from CMTS 106. A time $T_{CM-D}$ is the CMTS time cable modem 110 received the CMTS time $T_{CMTS}$.

At 504, cable modem 110 receives the delay value calculated for the cable modem $D_{CM-I}$. At 506, cable modem 110 calculates the target time that should be advertised to mobile network device 126 based on the time $T_{CM-D}$ and the delay value. The time $T_{CM-I-M}$ is equal to $=T_{CM-D}+T_{CM-I}$. The time $T_{CM-I-M}$ takes into account the delay from sending a packet with the time $T_{CMTS}$ from CMTS 106 to cable modem 110.

Alternative Embodiments

Figure 6:
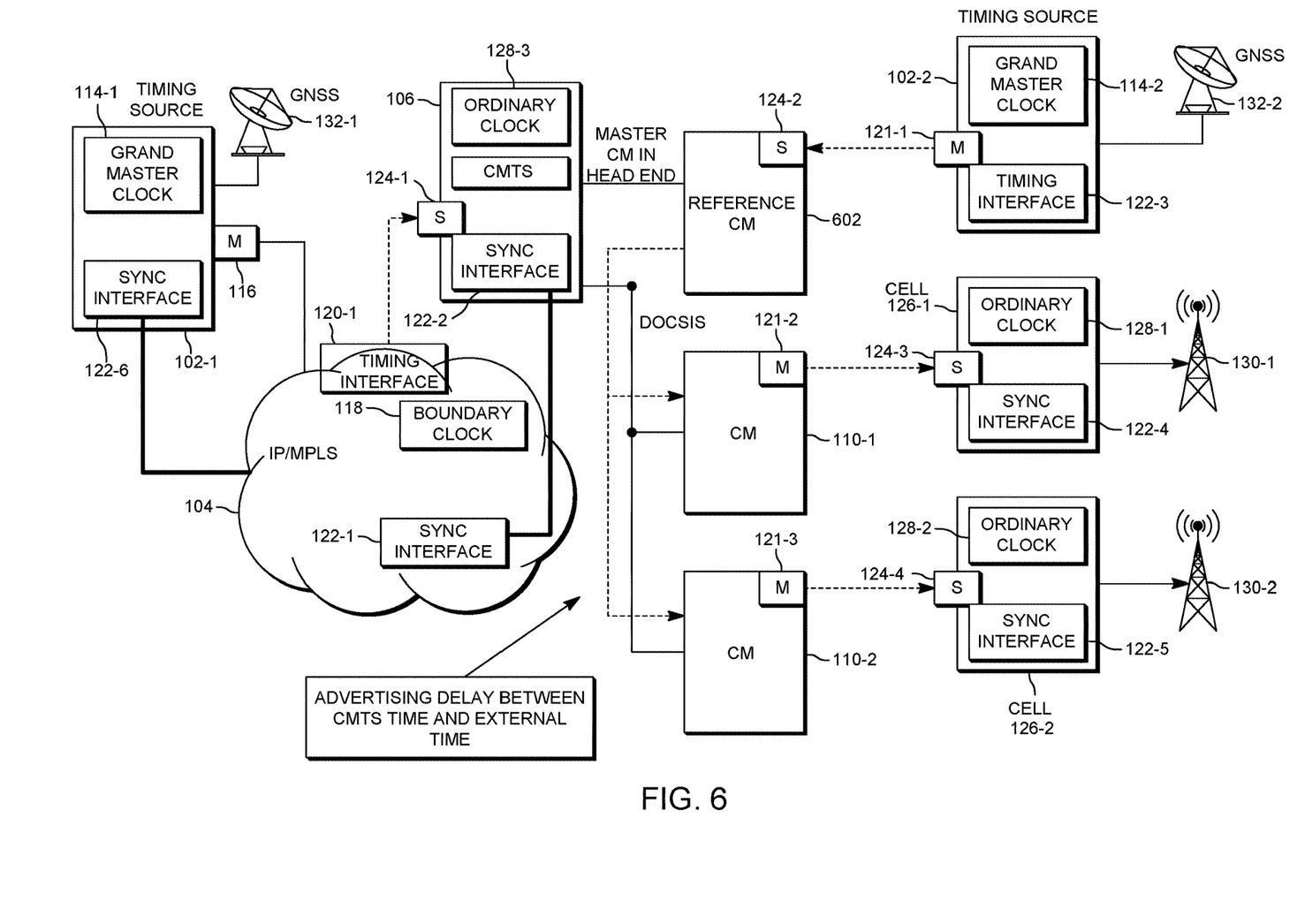
FIG. 6 depicts an example of a system that places a reference cable modem close to the CMTS according to some embodiments.

One example to possibly enhance the accuracy may be to place a reference cable modem close to CMTS 106 instead of over a network. For example, a reference cable modem may be placed with only a few nanoseconds (NS) of propagation delay to approximate the external time. FIG. 6 depicts an example of a system that places a reference cable modem close to CMTS 106 according to some embodiments. At 602, a reference cable modem has been placed in the head end with CMTS 106. That is, reference cable modem 602 may be the same network device as CMTS 106. This reduces the delay between CMTS 106 and reference cable modem 602.

The ranging information between each cable modem 110 to CMTS 106 may then be used to calculate the delay differences between reference cable modem 602 and cable modems 110-1 and 110-2. The reference CM path is short and constant and does not suffer from ranging dynamic changes as remote CMs might suffer. In addition, if the reference CM receives the same reference as the CMTS, the time error between the two different GMs is eliminated (~100 ns reduction).

Conclusion

Accordingly, reference cable modem 108 maintains synchronization in the network when a non-DOCSIS protocol is used to advertise the timing synchronization through a DOCSIS network that may have asymmetry delays. The network avoids having to measure the asymmetry delays through the network by using an external timing source. This simplifies the synchronization process by reducing the number of measurements and also simplifying the calculation for the delay.

System

Figure 7:
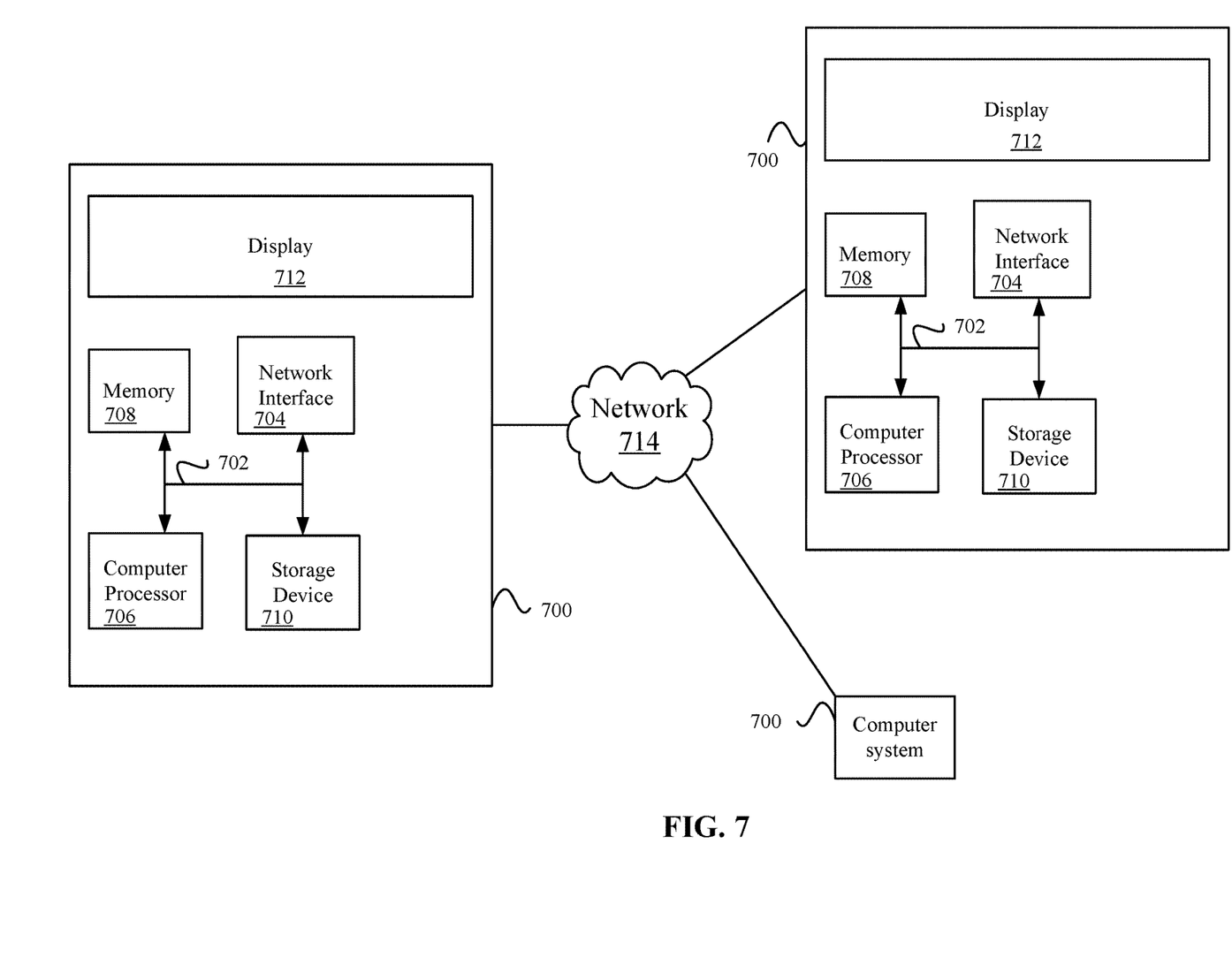
FIG. 7 illustrates an example of special purpose computer systems according to one embodiment.

FIG. 7 illustrates an example of special purpose computer systems 700 according to one embodiment. Computer system 700 includes a bus 702, network interface 704, a computer processor 706, a memory 708, a storage device 710, and a display 712. Computer system 700 may be an example of different entities described, such as cable modems 108 and 110 or CMTS 106.

Bus 702 may be a communication mechanism for communicating information. Computer processor 706 may execute computer programs stored in memory 708 or storage device 708. Any suitable programming language can be used to implement the routines of some embodiments including C, C++, Java, assembly language, etc. Different programming techniques can be employed such as procedural or object oriented. The routines can execute on a single computer system 700 or multiple computer systems 700. Further, multiple computer processors 706 may be used.

Memory 708 may store instructions, such as source code or binary code, for performing the techniques described above. Memory 708 may also be used for storing variables or other intermediate information during execution of instructions to be executed by processor 706. Examples of memory 708 include random access memory (RAM), read only memory (ROM), or both.

Storage device 710 may also store instructions, such as source code or binary code, for performing the techniques described above. Storage device 710 may additionally store data used and manipulated by computer processor 706. For example, storage device 710 may be a database that is accessed by computer system 700. Other examples of storage device 710 include random access memory (RAM), read only memory (ROM), a hard drive, a magnetic disk, an optical disk, a CD-ROM, a DVD, a flash memory, a USB memory card, or any other medium from which a computer can read.

Memory 708 or storage device 710 may be an example of a non-transitory computer-readable storage medium for use by or in connection with computer system 700. The non-transitory computer-readable storage medium contains instructions for controlling a computer system 700 to be configured to perform functions described by some embodiments. The instructions, when executed by one or more computer processors 706, may be configured to perform that which is described in some embodiments.

Computer system 700 includes a display 712 for displaying information to a computer user. Display 712 may display a user interface used by a user to interact with computer system 700.

Computer system 700 also includes a network interface 704 to provide data communication connection over a network, such as a local area network (LAN) or wide area network (WAN). Wireless networks may also be used. In any such implementation, network interface 704 sends and receives electrical, electromagnetic, or optical signals that carry digital data streams representing various types of information.

Computer system 700 can send and receive information through network interface 704 across a network 714, which may be an Intranet or the Internet. Computer system 700 may interact with other computer systems 700 through network 714. In some examples, client-server communications occur through network 714. Also, implementations of some embodiments may be distributed across computer systems 700 through network 714.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method implemented in a cable modem synchronized to a time source, the method comprising:
    receiving a message having a time stamp specifying a send time, from an upstream sending device in a network and based on a reference source, and using the time source to determine a receive time at the cable modem;
    calculating a one-way delay from the sending device to the cable modem using the send time and the receive time; and
    sending the value of the one-way delay to an upstream network device.

2. The method of claim 1, wherein the message was sent in a packet through a cable network from at least one of a Cable Modem Termination System (CMTS) and a Remote Physical Device (RPD).

3. The method of claim 1 where the message was sent using a packet-based protocol.

4. The method of claim 3, wherein the packet based protocol is Data Over Cable Service Interface Specification (DOCSIS).

5. The method of claim 1 where the upstream network device is the upstream sending device.

6. The method of claim 1 where the time source is a Global Network Satellite System (GNSS).

7. A method comprising:
    receiving, by a computing device, a network device, the first time derived from a first timing source in a first domain;
    receiving, by the computing device, a second time in a second domain from a second timing source;
    calculating, by the computing device, a difference time value between the first time and the second time; and
    sending, by the computing device, the difference time value to the network device.

8. The method of claim 7 where the network device uses the difference time value to send a delay value to other computing devices to synchronize timing of the other computing devices in the second domain, and wherein the other computing devices are configured to synchronize the respective time using the delay value with mobile devices to allow timing synchronization between the mobile devices.

9. The method of claim 7 where the computing device is a cable modem.

10. The method of claim 9 where the second timing source is a first grandmaster clock receiving GNSS data.

11. The method of claim 10 where the first timing source is a second grandmaster clock receiving GNSS data.

12. The method of claim 7 where the difference time value quantifies a one-way delay from the network device to the computing device.

13. The method of claim 7 where the first time is obtained from a time stamp sent by the network device and specifying a send time.

14. The method of claim 13 where the second time is a time of receipt of the time stamp by the computing device.

* * * * *